Jan. 13, 1953 W. A. DOWNES 2,625,599
APPARATUS AND METHOD FOR TESTING THE ACCURACY OF SYNCHROS
Filed Feb. 21, 1952 2 SHEETS—SHEET 1

INVENTOR.
WILLIAM A. DOWNES
BY
ATTORNEYS

Jan. 13, 1953 W. A. DOWNES 2,625,599
APPARATUS AND METHOD FOR TESTING THE ACCURACY OF SYNCHROS
Filed Feb. 21, 1952 2 SHEETS—SHEET 2

INVENTOR.
WILLIAM A. DOWNES
BY
ATTORNEYS

Patented Jan. 13, 1953

2,625,599

UNITED STATES PATENT OFFICE 2,625,599

APPARATUS AND METHOD FOR TESTING THE ACCURACY OF SYNCHROS

William A. Downes, Old Mystic, Conn., assignor to the United States of America as represented by the Secretary of the Navy Application February 21, 1952, Serial No. 272,874

7 Claims. (Cl. 177—337)

(Granted under Title 35, U. S. Code (1952), sec. 266)

This invention relates to synchro testing and is directed particularly to an apparatus and method for measuring the precision with which phase shift in a synchro follows the angular displacement of its rotor.

It is common in radar practise to use synchros to shift the phase of three-phase sweep signals used in P. P. I. (plan position indicator) scope presentations. Since the amount of phase shift must be equal to the angular displacement of the radar antenna in azimuth in order that a true radar picture be presented, it is very important that synchros used for this purpose be extremely accurate.

Accordingly, it is one object of this invention to provide a simple and precise method and means whereby synchros can be tested for phase-shift accuracy.

It is another object of this invention to provide a method and means whereby the phase-shifting accuracy of a synchro can be calibrated through 360 degrees of rotation of the synchro shaft.

Other objects and many of the attendant advantages of this invention will be readily appreciated as the same becomes better understood by reference to the following detailed description when considered in connection with the accompanying drawings wherein.

Figure 1:
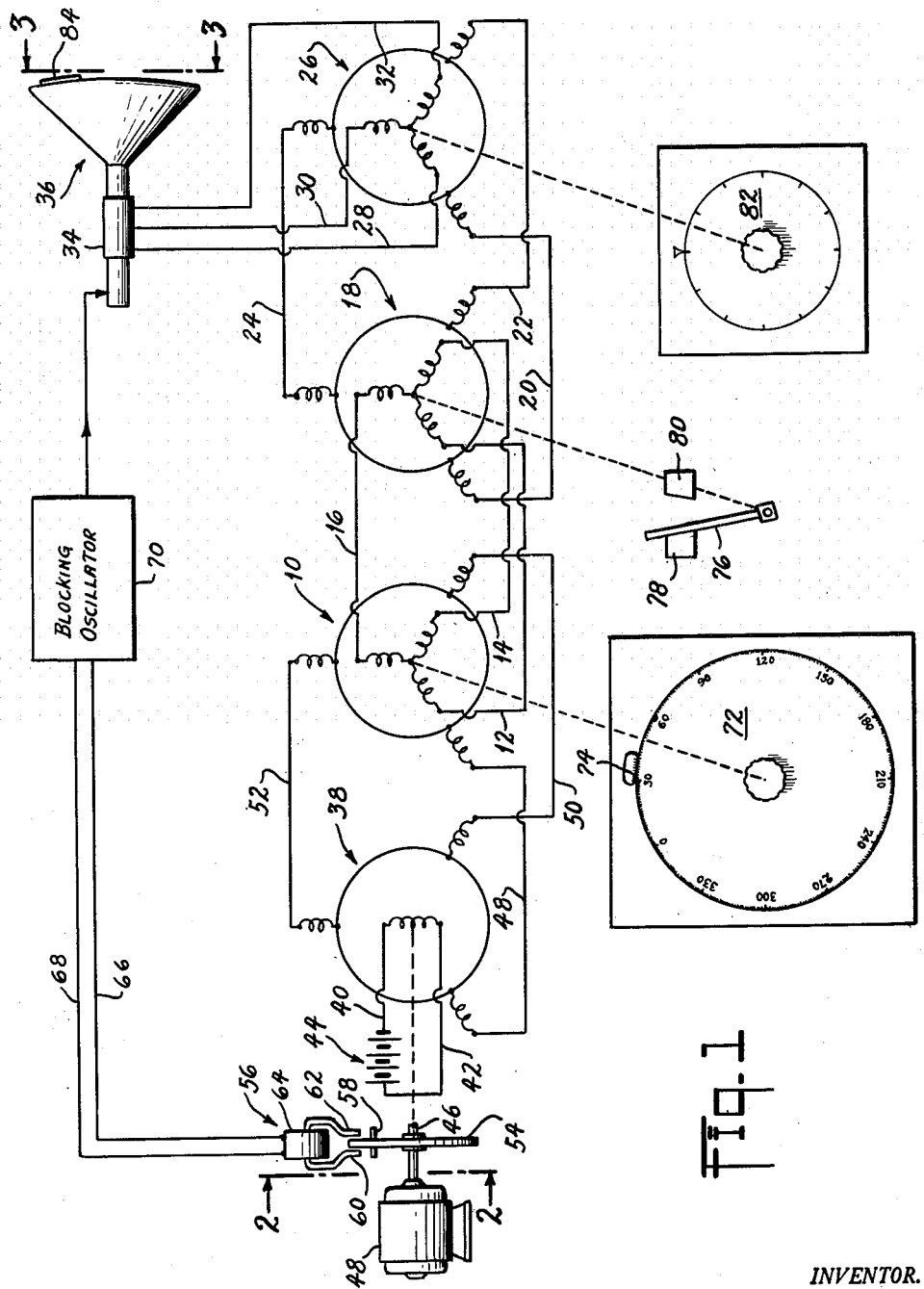
Fig. 1 is a schematic drawing of the synchro test set-up comprising the invention.

Briefly, the principle involved in the method disclosed herein for testing a synchro used as a phase shifter is that of using a second synchro as a "reference" phase shifter and a third synchro as a "zeroing" phase shifter, all phase shifters being connected in series, as a means of shifting the phase of the supply voltage in constant, arbitary steps. After each step the synchro under test is used to restore the original phase conditions, as indicated by a device, such as an oscilloscope, capable of showing one particular phase condition with precision. These indicated phase shifts are then compared with an arbitrary amount assigned to the "reference" phase shift. The cumulative deviation from the "reference" shift is plotted throughout a 360 degree over-all change; the difference between the maximum and minimum on the curve being the maximum total error.

In the drawings, wherein like reference numerals denote corresponding parts throughout the several views, the numeral 10 indicates the synchro under test, having its three-phase rotor connected by the wires 12, 14 and 16 to the corresponding rotor terminals of a similar "reference" synchro 18. The "reference" synchro 18 has its stator windings connected by wires 20, 22 and 24 to corresponding stator windings of another similar "zeroing" synchro 26, which, in turn, has its rotor connected by wires 28, 30 and 32 to a three-phase deflection coil 34 associated with a cathode ray tube 36.

The three-phase test signal used is generated by a synchro 38 having a single rotor winding connected by wires 40 and 42 to a D.-C. supply battery 44. The rotor is driven through a connecting shaft 46 by an electric motor 48. A motor speed of 5400 R. P. M., inducing a 90 cycle three-phase A.-C. voltage in the stator windings of the synchro 38, has been used in the test procedure herein disclosed. However, speeds inducing a 60 cycle or even a 30 cycle A.-C. frequency could have been used alternatively without affecting test results.

The test synchro 10 is energized by the connection of its stator windings to the corresponding stator windings of the synchro 38 by wires 48, 50 and 52.

It will be apparent to those skilled in the art that, by reason of the series interconnection of the synchros 10, 18 and 26, the three-phase voltage supplied by the generator synchro 38 to the deflection coil 34 can be shifted by turning any one of their rotors.

Ordinarily, a three-phase signal of constant amplitude, such as supplied by the generator synchro 38, will produce a circular trace on a P. P. I. cathode ray tube screen, therefore giving no indication of phase. In the present invention, however, means is provided for indicating phase on the screen, said means comprising the technique of brightening the circular sweep for only an instant during each cycle, so as to produce a spot the position of which determines phase.

In order that the spot be brightened at the same instant during each cycle, i. e., in order that the phase relationship of the brightening instant with respect to the A.-C. signal be constant, an electric triggering-pulse controlling brightening is generated at the origin of the A.-C. signal by an arrangement comprising a disc 54 driven by the motor shaft 46, and a magnetic pick-up device 56 associated with said disc and fixed relative the axis of rotation thereof. Piercing the disc 54 and located near its rim is an iron pin 58 which occupies a very small fraction of the 360 degrees of the disc. Once during every rotation of the disc 54, the pin 58 passes the pole pieces 60, 62 of the magnetic pick-up device and disturbs its magnetic field. The disturbance consists of an increase of the field about the coil 64 of pick-up device 56 as the pin 58 approaches, and a decrease as the pin passes. The sudden change-over from an increasing to a decreasing field produces a steep electrical wave-front, which is connected by wires 66 and 68 to the input circuit of a blocking oscillator 70. The steep wave-front is differentiated and amplified to form a suitable trigger pulse for starting the blocking oscillator 70, the pulse output of which is the brightening signal to the cathode ray tube 36. Since differential circuits, electronic amplifiers, and cathode ray tube blanking and brightening circuits are well-known in the art, they are shown simply in block form in the drawing.

It is evident from the foregoing that the brightening pulse will always have a constant phase relationship with respect to the three-phase signal at the generator synchro 38.

A calibrated dial 72, connected to the rotor shaft of the test synchro 10, measures the angular position of its rotor. By means of the vernier scale 74 it is possible to measure the position of the test synchro rotor to within a tenth of a degree.

A bar handle 76 is securely fixed to the rotor shaft of the "reference" synchro 18. In operation of the test apparatus, the bar handle is held, in any convenient manner, such as by a sponge rubber wedge, not shown, against one or the other of the stops 78 and 80. The stops 78 and 80 are rigidly fixed with respect to the "reference" synchro 18 so that phase shift introduced by moving the bar handle 76 from one stop to the other will be reproducible with precision. The stops 78 and 80 preferably are spaced a distance such that a phase shift of approximately 10 degrees is introduced by moving the bar handle 76 from one to the other.

The shaft of the "zeroing" synchro 26 is connected to a friction dial, such as a friction vernier drive 82, so that it will retain its shaft setting during readings of the test synchro dial. As will be apparent from the following, precise positioning of the "zeroing" synchro 26 with its dial or with stops is not required.

Figure 3:
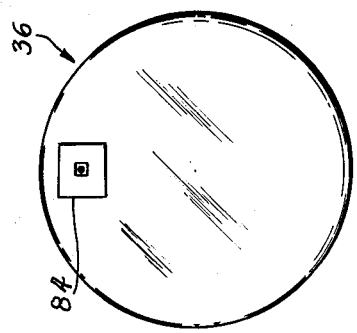
Fig. 3 is a vertical cross-sectional view taken along the line 3—3 of Fig. 1, illustrating in front elevation the apertured mask on the front of the test oscilloscope for establishing a spot reference point.
Figure 2:
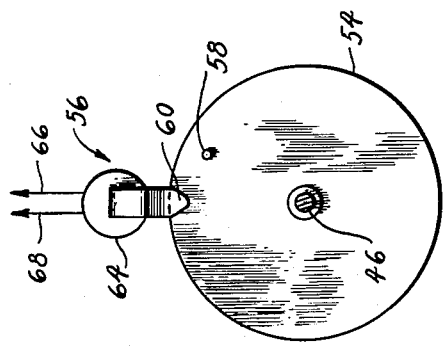
Fig. 2 is a vertical cross-sectional view taken along the line 2—2 of Fig. 1, illustrating in front elevation the disc and magnetic pick-up device for supplying the sweep-brightening trigger pulse.

In starting the operation of obtaining accuracy data on the test synchro 10, the synchro dial 72 is set at zero, the generator synchro 38 is driven by the motor 48, and the spot on the screen of the cathode ray tube 36 is adjusted, by turning the dial 82 of the "zeroing" synchro 26, until it appears centered in the small rectangular aperture in the mask 84 fixed against the face of the screen. (See Fig. 3.)

Figure 4:
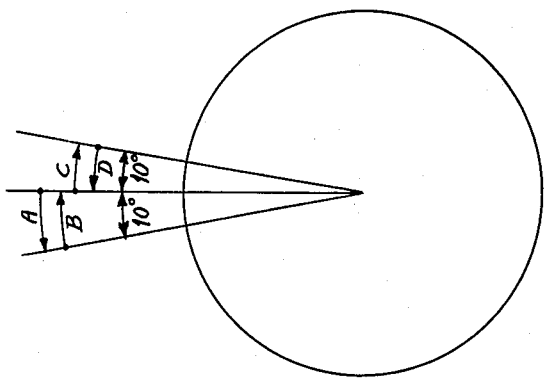
Fig. 4 is a diagram illustrating the movements of the spot required for one reading of the phase-shift angle-of-rotation plot of the synchro under test.

In following the test procedure used, it is helpful to refer to Fig. 4, which indicates the angular movements of the spot required for one reading. The order of procedure is as follows: (1) the bar handle 76 of the "reference" synchro 18 is moved from one of the stops 78, 80 to the other, introducing a phase shift of about 10 degrees to produce movement A of the spot; (2) with the test synchro 10, the spot is next restored to its original position (movement B); (3) a reading is then taken of the test synchro dial 72; (4) the bar handle 76 of the "reference" synchro is then returned to the original stop (movement C); (5) the spot is finally restored to its original position by turning dial 82 of the "zeroing" synchro 26. Steps 1 through 5 are repeated until the test synchro 10 has been turned through 360 degrees.

Since the phase shift steps introduced by the "reference" synchro 18 are constant, any variance in the matching steps required of the test synchro rotor indicates error in the phase-shift angle-of-rotation characteristic of the synchro tested. By use of the data obtained, the cumulative deviation from the "reference" shift can be plotted throughout a 360 degree over-all change. The difference between the maximum and minimum deviation on the curve will be the maximum total error.

Obviously many modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

I claim:
1. Apparatus for calibrating a phase-shifter comprising a "reference" phase-shifter settable selectively to accomplish either of two discrete amounts of phase shift, another phase-shifter settable to accomplish any amount of phase shift within a range of amounts, detecting means responsive to changes in phase, a source of A.-C. electrical energy, and means for connecting said "reference" and said other phase-shifter in series with the to-be-calibrated phase-shifter and for interposing all three phase-shifters between said source of electrical energy and said detecting means.

2. The invention as defined in claim 1 wherein said phase-shifters are synchros.

3. The invention as defined in claim 1 wherein said phase-responsive detecting means comprises a cathode ray tube, deflection means in circuit with said phase-shifters for producing a circular sweep of the electron beam within said cathode ray tube, and means controlled by the frequency of said source of A.-C. electrical energy for brightening the cathode ray tube screen for a small portion of said circular sweep so as to produce a spot on said cathode ray tube screen for a small portion of said circular sweep, the rotary position of which is determined by the amount of phase shift introduced by said phase shifters.

4. The invention as defined in claim 3 wherein said frequency controlled brightening means comprises a disc rotating at a speed in synchronism with the frequency of said A.-C. source, a magnetic element fixed at a radial position on said disc, and a magnetic pickup device fixed with respect to the axis of rotation of said disc and disposed so as to be influenced by the rotary passage of said magnetic element, whereby a reference voltage synchronous with the frequency of said A.-C. source is induced in said magnetic pick-up device.

5. In apparatus for testing the accuracy of a synchro when used as an electrical phase-shifter, the combination comprising a rotary A.-C. generator, means for driving said generator, a "test" synchro settable to accomplish any amount of phase shift within a range of amounts, a "reference" synchro settable to accomplish a discrete amount of phase shift, series electrical interconnection means between said "test" synchro, said "reference" synchro and the synchro to be tested, detecting means responsive to changes in phase, and means for interposing electrically said series-connected synchros between said A.-C. generator and said detecting means.

6. The invention as defined in claim 5 wherein said phase-responsive detecting means comprises a cathode ray tube, deflection means in circuit with said synchros for producing a circular sweep of the electron beam within said cathode ray tube, and means controlled by the speed of said generator driving means for blanking the cathode ray tube screen for nearly all of its circular sweep so as to produce a spot on said cathode ray tube screen the rotary position of which is determined by the amount of phase shift introduced by said synchros.

7. The method of testing the accuracy of a synchro used as a phase shifter which consists in passing an A.-C. voltage through the synchro to be tested, a "reference" synchro and a "zeroing" synchro in series; resetting the rotor of said "reference" synchro by a fixed amount from a first position to a second to produce a given amount of phase-shift in said A.-C. voltage; resetting said test synchro to restore the original phase condition in the output voltage of said synchros; reading the angular displacement of the rotor of said test synchro determined by said resetting thereof; restoring the rotor of said "reference" synchro to its first position; resetting said "zeroing" synchro to again restore the original phase condition in the output voltage of said synchros; and then repeating the above steps to determine a plurality of successive angular displacement position readings of said test synchro.

WILLIAM A. DOWNES.

REFERENCES CITED

The following references are of record in the file of this patent:

UNITED STATES PATENTS

| Number | Name | Date |
|---|---|---|
| 2,609,434 | Gerth | Sept. 2, 1952 |